Patented May 18, 1948

2,441,595

UNITED STATES PATENT OFFICE 2,441,595

PROCESS FOR PRODUCING CHLOROHYDRINS OF POLYHYDRIC ALCOHOLS

Henry Rapoport, Berkeley, Calif., assignor to Heyden Chemical Corporation, New York, N. Y., a corporation of Delaware No Drawing. Application November 30, 1944, Serial No. 566,028

1 Claim. (Cl. 260—633)

The present invention relates to pentaerythrityl chlorides or chlorohydrins and new compounds which are chlorides or chlorohydrins of other polyhydric alcohols, such as chlorohydrins of dipentaerythritol and trimethylolpropane, and to processes for producing such compounds. In one of its more specific embodiments it relates to the production of pentaerythrityl tetrachloride directly from pentaerythritol and para-toluenesulfonyl chloride in the presence of pyridine in substantial proportions.

Pentaerythrityl tetrachloride, which is also known as pentaerythrityl tetrachlorohydrin, tetrakis-(chloromethyl)-methane, $1,3,2^1,2^{1\prime}$ - tetrachloro - 2,2 - dimethylpropane and tetrachloropentaerythritol, is a compound having the formula $C(CH_2Cl)_4$. Its melting point is approximately 97° C. and its boiling point is approximately 110° at a pressure of 12 mm. of mercury. The compound is volatile with steam and has a camphoraceous odor. For simplicity the compound will be referred to throughout this specification as pentaerythrityl tetrachloride or pentaerythrityl tetrachlorohydrin.

Heretofore pentaerythrityl tetrachloride was prepared by heating pentaerythritol trichlorohydrin with phosphorous pentachloride at 150° C. (Fecht, Berichte, 1907, Vol. 40, page 3888). It has also been prepared by heating pentaerythritol disulfite $(C_5H_8O_6S_2)$ with sulfurous oxychloride, i. e., thionyl chloride $(SOCl_2)$, in the presence of a pyridine hydrochloride catalyst (F. Govaert, M. Hansens and M. Beyaert, Versl. Gewone Vergadering Afdeel. Natuurkunde, 1943, vol. 52, pages 135–137; Chem. Zentr., 1943, vol. II, page 1358, see Chem. Abs., 1944, vol. 38, column 5201). In this latter process the yield was said to be almost quantitative. The pentaerythritol disulfite (melting point 151° C.) was prepared by the reaction of pentaerythritol and thionyl chloride. No method is known for the direct production of pentaerythrityl tetrachloride from pentaerythritol in one step.

It is an object of the present invention to provide a process for the production of pentaerythrityl tetrachloride directly from pentaerythritol in one step and for the production from the respective polyhydric alcohols of similar polychlorides of related polyhydric primary alcohols in which all the hydroxyl radicals of the polyhydric alcohol are replaced by chlorine radicals.

A further object of the invention is to provide new chlorides and chlorohydrins of certain polyhydric alcohols.

A further object of the invention is to provide a process for the reaction of para-toluenesulfonyl chloride with pentaerythritol and related polyhydric alcohols to produce in good yields chlorides or chlorohydrins of the polyhydric alcohols in which all the hydroxyl radicals of the polyhydric alcohol are replaced by chlorine radicals.

It is another object of the invention to provide a process for the production of the desired chloride or chlorohydrin of the polyhydric alcohol as the predominant product in order to obviate difficulties in its recovery from the reaction mixture.

Further objects and advantages of the invention, some of which are referred to specifically hereinafter, will be obvious to those skilled in the art to which the invention pertains.

Heretofore certain alcohols have been reacted with paratoluenesulfonyl chloride but the products, except those obtained from tertiary or highly reactive alcohols, have been esters of para-toluenesulfonic acid. The yields of the chloride, if formed at all, have generally been small. Polyhydric alcohols such as carbohydrates have also been reacted with para-toluenesulfonyl chloride but the products have been esters of para-toluenesulfonic acid which were partially chlorinated; in no case were all the hydroxyl radicals of the polyhydric alcohol replaced completely by chlorine radicals. Certain of these prior results are as follows:

A small amount of methyl chloride was isolated from the mixture obtained by heating methyl alcohol and para-toluenesulfonyl chloride together in a sealed tube (Kraft and Roos, Berichte, 1893, vol. 26, page 2826). Ethyl alcohol was also heated with para-toluenesulfonyl chloride but the products were not isolated.

Tertiary butyl chloride was obtained by the reaction of tertiary butyl alcohol and para-toluenesulfonyl chloride in pyridine at 100° C. (Bennett and Hafey, J. Chem. Soc. London, 1941, page 656.) Tertiary butyl alcohol is a very reactive alcohol which is readily converted to tertiary butyl chloride by shaking with hydrochloric acid.

Alpha-phenylethyl chloride is said to be formed from methyl phenyl carbinol by reaction of the latter with para-toluenesulfonyl chloride in pyridine (Suter, "The Organic Chemistry of Sulfur," John Wiley and Sons, New York, N. Y., 1944, pages 507 to 508).

A 30% yield of the corresponding chloride and a 42.5% yield of the para-toluenesulfonate ester were obtained when beta-hydroxyethyl phenyl ether was reacted with para-toluenesulfonyl chloride in pyridine below 40° C. (Butler, Renfrew, Cretcher and Souther, J. Amer. Chem. Soc., 1937, vol. 59, page 227.)

The reactions of carbohydrates with para-toluenesulfonyl chloride in pyridine at temperatures within the range of 20° to 100° C. were reported by the following investigators:

Hess and Pfleger, Annalen, 1933, vol. 507, page 48.
Hess and Ljubitsch, Annalen, 1933, vol. 507, page 62.
Levene and Tipson, J. Biol. Chem., 1934, vol 105, page 419.
Littman and Hess, Berichte, 1934, vol. 67, page 526.
Hess and Stenzel, Berichte, 1935, vol. 68, page 981.
Bell, Friedmann and Williamson, J. Chem. Soc. London, 1937, page 252.
Wolfe, Hann and Hudson, J. Amer. Chem. Soc., 1942, vol. 64, page 1493.
Cramer and Purves, J. Amer. Chem. Soc., 1939, vol. 61, page 3458.

In all cases, chlorine-containing para-toluenesulfonic acid esters were obtained but in no case were all the hydroxyl radicals of the carbohydrate replaced by chlorine radicals.

In accordance with the process of the present invention, pentaerythritol or a related polyhydric alcohol is reacted with para-toluenesulfonyl chloride or its equivalent in the presence of substantial amounts of pyridine or its equivalent at a temperature in excess of approximately 100° C. and preferably within the range from 125° to 150° C. Generally the preferred proportions are 1 mol of pentaerythritol, 4 mols of para-toluenesulfonyl chloride (1 mol for each hydroxyl radical), and 12 to 16 mols of pyridine (3 to 4 mols of pyridine per molecular equivalent of para-toluenesulfonyl chloride). As exemplary of a particular general procedure for practicing the process, the para-toluenesulfonyl chloride is dissolved in the pyridine and the pentaerythritol is added thereto in small portions so that the temperature does not exceed approximately 50° C. during the addition. After all the pentaerythritol is added the mixture is heated gently under reflux, which will generally be at a temperature between approximately 125° and approximately 135° C., for several hours. The mixture is then cooled, the precipitated pyridinium para-toluenesulfonate is removed by filtration and the filtrate is diluted with ice-cold water. After allowing the mixture to stand at a low temperature the crystalline pentaerythrityl tetrachloride is separated by filtration and washed with water. It may be further purified by recrystallization from methanol-water or ethanol-water mixtures or by distillation with steam or distillation or sublimation at reduced pressure. Decolorizing or absorbent charcoals may be used to remove colored impurities, if the product is to be purified by crystallization.

The process as above summarized is applicable generally to the production of chlorides and chlorohydrins of polyhydric alcohols such as pentaerythritol, trimethylolpropane and dipentaerythritol, particularly for the production of such chlorides which have chlorine radicals substituted for each hydroxyl radical of the original alcohol. By means of the process of the invention it has been possible to prepare the hexachloride of dipentaerythritol and the trichloride of trimethylolpropane(1,1,1-tris-(chloromethyl)-propane), both of which are new compounds, without difficulty and in good yields.

The process is also applicable to the production of partially chlorinated derivatives of these polyhydric alcohols by effecting the blocking of certain of the hydroxyl groups, for example, by formation of an acetone condensation product, and after reaction with para-toluenesulfonyl chloride, hydrolyzing the resulting product to obtain a hydroxyl-containing chlorinated product. Such a process is illustrated in Example 4 hereinafter. The blocking of the hydroxyl groups may be effected with reagents other than acetone, such as benzaldehyde, acetaldehyde, furfuraldehyde, and other aldehydes and ketones, as is well understood in the art.

The process of the invention is not applicable to all polyhydric alcohols, however, but only to those which have only primary alcohol or carbinol radicals. Glycerol, for example, when reacted with para-toluenesulfonyl chloride in pyridine at 100° C., yielded only intractable tars from which no crystalline material could be isolated. The explanation is not obvious but the difference may result from differences in the reaction rates of primary and secondary alcohol or carbinol radicals. Pentaerythritol, trimethylolpropane and dipentaerythritol have only primary alcohol radicals whereas glycerol has a secondary alcohol radical.

It is apparently immaterial whether the pentaerythritol is added to the solution of para-toluenesulfonyl chloride in pyridine, or pyridine is added to a mixture of para-toluenesulfonyl chloride and pentaerythritol, or whether para-toluenesulfonyl chloride is added to a mixture of pentaerythritol and pyridine.

The reaction temperature which should be used in practicing the process of the invention is generally that sufficient to maintain a gentle reflux. Normally this will be within the preferred range of approximately 125° to approximately 135° C. or 150° C. but it will be determined somewhat by the particular reactants and the proportions in which they are present in the reaction mixture. Variation of the yields may be obtained by controlling the period of heating. Generally, a period within the range of approximately 2 to approximately 24 hours is desired. Shorter reaction times are desirable with pentaerythritol than with dipentaerythritol, for example, and it is to be understood that the optimum periods for specific polyhydric alcohols may be within different portions of this range.

Instead of using pyridine, a C-alkyl-substituted pyridine, such as C-methylpyridine, may be used without substantial advantage over pyridine. Various other organic nitrogen compounds which are capable of taking up and liberating hydrogen chloride may also be used in place of pyridine, for example, such reagents as quinoline and N,N-dimethylaniline and liquid tertiary amines in general. Pyridine is preferred since it is generally more readily available and has the advantage of providing the desired control of temperature during the heating.

In place of para-toluenesulfonyl chloride, various other aromatic sulfonyl chlorides which are capable of forming esters with pentaerythritol and related compounds may be used, for example, benzenesulfonyl chloride, ortho-toluenesulfonyl chloride, paraxylenesulfonyl chloride, and the like.

Generally there should be present during reaction approximately 3 to approximately 4 mols of pyridine or its equivalent for each mol of para-toluenesulfonyl chloride or its equivalent and one mol of para-toluenesulfonyl chloride or its equivalent for each hydroxyl radical to be replaced. These proportions may be varied somewhat, as understood in the art. The pyridine should be dry so as to prevent any side reaction of water with the para-toluenesulfonyl chloride or its equivalent.

Although the mechanism of the reactions involved in the process of the invention is not clearly understood, it has been rather exhaustively investigated with respect to trimethylolpropane, which is unique in that it dissolves in or reacts immediately with para-toluenesulfonyl chloride in pyridine at a low temperature and the resulting para-toluenesulfonyl ester of trimethylolpropane separates out. This intermediate ester may itself be separated and reacted with hydrogen chloride in pyridine to produce trimethylolpropane trichloride. The reactions may therefore be represented as follows:

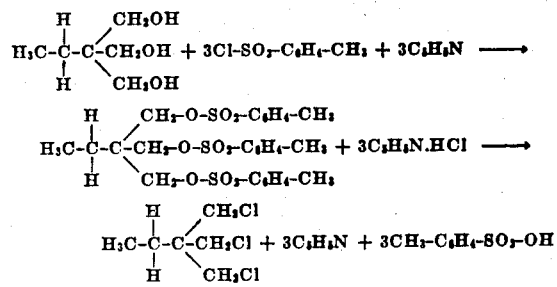

Although in the foregoing equations only 1 mol of pyridine for each mol of para-toluenesulfonyl chloride is represented, actually a ratio of 3 to 4 mols of pyridine for each mol of para-toluenesulfonyl chloride functions more satisfactorily.

Typical methods of practicing the process of the invention and certain of the new compounds which it has been possible to prepare by means of the process are illustrated in the examples which follow:

*Example 1.—Preparation of pentaerythrityl tetrachloride, $C(CH_2Cl)_4$*

To a mixture consisting of 6.8 grams (0.05 mol) of pentaerythritol and 50 grams (0.26 mol) of para-toluenesulfonyl chloride is added 50 ml. (approximately 0.64 mol) of dry pyridine. If the pyridine is added suddenly the temperature will rise to as high as 70° C. So the addition should be made portionwise and gradually. After the pyridine is all added the mixture is heated gently under reflux at a temperature of approximately 143° C. or thereabout for approximately 2 hours. There may be another sudden rise in temperature to as high as 140° C., depending upon how completely the reaction has progressed at the start of heating. During the heating a solid may separate.

After heating under reflux the resulting material is cooled until crystals separate and the product has a mushy consistency, whereupon it is filtered with the aid of suction to remove the crystals and washed twice with 5 cc. portions of pyridine. The crystals are pyridinium para-toluenesulfonate which when pure have a melting point of approximately 118-119° C. The yield of dry crystals of pyridinium para-toluenesulfonate is approximately 46 grams, or approximately 92% of the theoretical.

The clear filtrate is cooled in an ice bath and 200 ml. of water are added thereto with stirring. The solid which separates is pentaerythrityl tetrachloride and it is filtered off with the aid of suction, washed twice with 25 cc. portions of water and dried. The yield is approximately 7 grams or 69% of the theoretical. The mother liquor from which the crystals were separated yields a small amount of a green oil upon adding water thereto and allowing the mixture to stand in an ice-box.

The pentaerythrityl tetrachloride crystals may be further purified by recrystallization from aqueous ethyl alcohol solutions and decolorization with activated charcoal. The crystals may be dried in a vacuum desiccator with phosphorus pentoxide. As thus purified and dried, the pentaerythrityl tetrachloride has a sharp melting point of 96-97° C. (97° is the reported melting point.) It may also be purified by distillation under reduced pressure, its boiling point at 12 mm. being approximately 110° C., or by sublimation under reduced pressure.

Alternatively, in preparing the compound, the para-toluenesulfonate may be dissolved in the pyridine, and after solution is complete, the pentaerythritol may be added thereto in small portions while the temperature is maintained below about 50° C.

*Example 2.—Preparation of 1,1,1-tris-(chloromethyl)-propane, $CH_3CH_2C(CH_2Cl)_3$*

To a solution consisting of 42.9 grams (0.225 mol) of paratoluenesulfonyl chloride dissolved in 55 ml. (approximately 0.7 mol) of dry pyridine (dried over potassium hydroxide) is added over the course of ½ hour 10 grams (0.075 mol) of trimethylolpropane (M. P. 57-58° C.). The temperature during the addition is maintained below 35° C. by external cooling. The trimethylolpropane dissolves or reacts completely in the solution at 35° C. After all the trimethylolpropane is added, a heavy precipitate of the tri-p-toluenesulfonic acid ester of trimethylolpropane (M. P., 105-106° C.) separates. The mixture is then heated slowly to approximately 129° C. and the resulting clear solution is heated under reflux at this temperature for approximately 20 hours. The ester originally formed is thereby converted to the desired trichloride. Upon cooling, pyridinium p-toluenesulfonate precipitates and is removed by filtration with suction. The yield of pyridinium p-toluenesulfonate dried by suction is approximately 61 grams or 107% of the theoretical yield.

The clear filtrate is poured into 400 ml. of water with stirring and then cooled. After cooling for several hours the crystals which separate are removed by filtration with suction. The yield of 1,1,1-tris-(chloromethyl)-propane crystals obtained in this manner is approximately 10 grams or 71% of the theoretical yield.

The product can be further purified by dissolving it in chloroform, washing the chloroform solution successively with dilute sulfuric acid, dilute sodium bicarbonate and distilled water and, after evaporating the chloroform at reduced pressure, recrystallizing the residue from methanol.

1,1,1-tris-(chloromethyl)-propane when purified in the foregoing manner is a white crystalline material having a melting point of 43-44° C. It readily sublimes in a vacuum and has an odor that can be characterized as camphoraceous and also resemblant of that of green corn.

*Example 3*

*Preparation of dipentaerythrityl hexachloride $C(CH_2Cl)_3—CH_2—O—CH_2—C(CH_2Cl)_3$*

To 35 ml. of pyridine which has been dried over solid potassium hydroxide is added at room temperature 22.9 grams (0.12 mol) of para-toluenesulfonyl chloride 5.0 grams (0.02 mol) of dipentaerythritol (M. P., 221.8-223° C.). The dipentaerythritol does not dissolve completely. The mixture is then heated gently under reflux at a temperature of approximately 127° C. for a period of approximately 22 hours and then allowed to cool. It is subsequently placed in an ice box. The crystalline pyridinium p-toluenesulfonate which separates is removed by filtration with the aid of suction and washed with 5 ml. of dry pyridine. The yield of pyridinium p-toluenesulfonate is approximately 26.3 grams or 87% of the theoretical.

The clear filtrate is subsequently added with stirring to approximately 400 ml. of mold water. The precipitated dipentaerythrityl hexachloride is thereafter removed by filtration, washed with cold water and dried by suction. The yield is approximately 5.6 grams or 77% of the theoretical yield. It can be purified further by the method described in Example 2 for the purification of 1,1,1-tris-(chloromethyl)-propane.

A product purified by an additional recrystallization from methanol and decolorization with activated carbon appeared as needle-like crystals having a melting point of 76° C. Dipentaerythrityl hexachloride, like pentaerythrityl tetrachloride and 1,1,1-tris-(chloromethyl)-propane, also has a camphoraceous odor.

*Example 4*

*Preparation of pentaerthritol dichloride*
$(CH_2OH)_2C(CH_2Cl)_2$

The dichloride of pentaerythritol may be made by condensing pentaerythritol with one molecular equivalent of acetone to block two of its four hydroxyl groups and form pentaerythritol monoacetonal, thereafter reacting this monoacetonal with para-toluenesulfonyl chloride in accordance with the process of this invention, and subsequently hydrolyzing the resulting dichloride of pentaerythritol monoacetal in the presence of a dilute mineral acid.

Into a 2-liter Erlenmeyer flask is placed 50 grams of finely powdered pentaerythritol, 265 ml. of water, 24 ml. of 37% hydrochloric acid and 1010 ml. of acetone. The mixture is agitated at room temperature for 15 minutes and then heated on a steam bath for an additional 15 minutes to effect solution of all the reactants. The solution is then permitted to stand at room temperature for approximately 18 hours. A dilute (25%) sodium hydroxide solution is subsequently added in sufficient amount to bring the pH of the reaction mixture to 8.3, and the solution is evaporated under a moderate vacuum (water aspirator pump) at a bath temperature of approximately 50° C. followed by a 2-hour treatment of the residue at 70° C. The dry solid approximately 77.5 grams in weight) is then pulverized and extracted in a Soxhlet extractor for 20 hours with petroleum ether (B. P., 30 to 60° C.) to remove any pentaerythritol diacetonal (approximately 1.5 grams of crude material is present). The monoacetonal of pentaerythritol is next recovered from the mixture remaining in the cup by extraction of the mixture for 20 hours with ether. On evaporation of the ether, approximately 21 grams (33% of the theoretical amount (of pentaerythritol monoacetonal (2,2-dimethyl-5,5-bis-(hydroxymethyl)-1,3-dioxane), having a melting point of 123-125° C., is obtained. This product may be recrystallized from a dilute ether solution to obtain a purer product having a melting point of 126-127° C.

To a solution consisting of 13.4 grams (0.07 mol) of paratoluenesulfonyl chloride dissolved in 30 ml. of dry pyridine is added slowly with shaking and cooling 6.2 grams (0.035 mol) of the purified pentaerythritol monoacetonal. The temperature during the addition of the pentaerythritol monoacetonal is maintained below 35° C. and all the monoacetonal dissolves therein. The solution is then heated at a temperature sufficient to maintain a gentle reflux for a period of approximately 16 hours and it is then allowed to cool. The precipitated pyridinium p-toluenesulfonate is removed by filtration with the aid of suction and washed with 5 ml. of dry pyridine, and the filtrate is evaporated under vacuum obtained with a water aspirator pump. The residual magma is dissolved in 100 ml. of chloroform and the resulting chloroform solution is washed successively with dilute sulfuric acid, aqueous sodium bicarbonate solution and then with water. The chloroform is then evaporated and the residue is recrystallized from a methanol-water solution after clarification of the solution with decolorizing carbon. The crystals may be dried in a dessicator over sulfuric acid, phosphoric acid, or phosphorus pentoxide.

The yield of pentaerythritol monoacetonal dichloride (2,2-dimethyl-5,5-bis-(chloromethyl)-1,3-dioxane) is approximately 3 grams or 40% of the theoretical. The product, after sublimation at a pressure of approximately 1 mm., has a melting point of 48-49° C.

A suspension of 1.5 grams of pentaerythritol monoacetonal dichloride in 25 ml. of 0.5N hydrochloric acid is heated on the steam bath. The effluent gas may be bubbled through a solution of iodine in 10% aqueous sodium hydroxide in order to observe the evolution of acetone, which forms iodoform with said solution. This reagent solution may also be used to determine when acetone is no longer being evolved. The evolution of acetone is complete after approximately 50 minutes of heating. The resulting solution is then evaporated in a vacuum obtained by means of a water aspirator pump and the syrupy residue is placed in an ice box. The resulting solid is then recrystallized from water or benzene and may be further purified by sublimation in vacuum.

Approximately 0.5 gram (42% of the theoretical yield) of pentaerythritol dichloride (pentaerythritol dichlorohydrin or 2,2-bis-(chloromethyl)-1,3-propanediol) is obtained in this manner. The product has a sharp melting point of 79-80° C.

Heretofore two independent investigators each reported that he had obtained pentaerythritol dichloride (2,2-bis-(chloromethyl)-1,3-propanediol or pentaerythritol dichlorohydrin) but the respective products each had different melting points, both of which differ from that of the compound obtained by me. Bougault (Compt. rend., 1896, vol. 123, page 188) obtained a product which had a melting point of 65° C. by heating pentaerythritol with sulfur dichloride ($S_2Cl_2$). Fecht (Berichte, 1907, vol. 40, page 3888) obtained his alleged pentaerythritol dichloride, which had a melting point of 95° C. and a boiling point of 160° at a pressure of 12 mm. and which was soluble in water and in benzene, by heating pentaerythritol with concentrated hydrochloric acid at 120° to 180° C. It is probable that the Bougault product contained sulfur and that the Fecht product was contaminated with other chlorinated products which it was not possible to separate by the method used by him.

The compounds of the invention, namely the chlorides and chlorohydrins of pentaerythritol, trimethylolpropane and dipentaerythritol, including the derivatives in which the hydroxyl radicals of the polyhydric alcohol are completely replaced by chlorine radicals and those in which only some of them have been replaced by chlorine radicals, are valuable intermediates for the preparation of other derivatives and for the production of resins and themselves possess insecticidal and fungicidal properties. Products in which all the hydroxyl radicals of the polyhydric alcohol have been replaced by chlorine radicals produce with sodium polysulfides materials that are similar to synthetic rubbers of the "Thiokol" type.

Inasmuch as the foregoing specification comprises preferred embodiments of the invention it is to be understood that the invention is not limited thereto, and that modifications and variations may be made therein in conventional manners without departing substantially from the invention, which is to be limited solely by the scope of the appended claim.

I claim:

A process for the production of pentaerythritol dichloride which comprises the condensation of pentaerythritol with acetone to produce pentaerythritol monoacetonal, heating the pentaerythritol monacetonal together with approximately 2 molecular equivalents of para-toluenesulfonyl chloride and at least approximately 6 molecular equivalents of pyridine at a temperature of at least approximately 100° C. to produce pentaerythritol monoacetonal dichloride, and subsequently hydrolyzing the resulting pentaerythritol monoacetonal dichloride to produce pentaerythritol dichloride.

HENRY RAPOPORT.

REFERENCES CITED

The following references are of record in the file of this patent:

UNITED STATES PATENTS

| Number | Name | Date |
|---|---|---|
| 2,140,481 | Rose et al. | Dec. 13, 1938 |
| 2,406,713 | Senkus | Aug. 27, 1946 |

OTHER REFERENCES

Bennett et al., "Jour. Chem. Soc.," London, 1941, page 656.

Butler et al., "Jour. Am. Chem. Soc.," vol. 59, page 227 (1937).

Suter, "The Organic Chemistry of Sulphur," pages 507-8.